(12) United States Patent
Yamamoto et al.

(10) Patent No.: US 12,331,377 B2
(45) Date of Patent: Jun. 17, 2025

(54) GRAIN-ORIENTED ELECTRICAL STEEL SHEET, INTERMEDIATE STEEL SHEET FOR GRAIN-ORIENTED ELECTRICAL STEEL SHEET, AND METHODS FOR MANUFACTURING SAME

(71) Applicant: NIPPON STEEL CORPORATION, Tokyo (JP)

(72) Inventors: Shinji Yamamoto, Tokyo (JP);
Yoshiyuki Ushigami, Tokyo (JP);
Shinsuke Takatani, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 189 days.

(21) Appl. No.: 17/421,758

(22) PCT Filed: Jan. 16, 2020

(86) PCT No.: PCT/JP2020/001170
§ 371 (c)(1),
(2) Date: Jul. 9, 2021

(87) PCT Pub. No.: WO2020/149334
PCT Pub. Date: Jul. 23, 2020

(65) Prior Publication Data
US 2022/0090225 A1 Mar. 24, 2022

(30) Foreign Application Priority Data
Jan. 16, 2019 (JP) ................ 2019-005200

(51) Int. Cl.
| | | |
|---|---|---|
| *H01F 1/18* | (2006.01) | |
| *C21D 3/04* | (2006.01) | |
| *C21D 6/00* | (2006.01) | |
| *C21D 8/00* | (2006.01) | |
| *C21D 8/12* | (2006.01) | |
| *C21D 9/46* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *H01F 41/02* | (2006.01) | |

(52) U.S. Cl.
CPC ............ *C21D 9/46* (2013.01); *C21D 3/04* (2013.01); *C21D 6/005* (2013.01); *C21D 6/008* (2013.01); *C21D 8/005* (2013.01); *C21D 8/1222* (2013.01); *C21D 8/1233* (2013.01); *C21D 8/1255* (2013.01); *C21D 8/1283* (2013.01); *C22C 38/001* (2013.01); *C22C 38/02* (2013.01); *C22C 38/04* (2013.01); *C22C 38/06* (2013.01); *H01F 1/18* (2013.01); *H01F 41/0233* (2013.01)

(58) Field of Classification Search
None
See application file for complete search history.

(56) References Cited

U.S. PATENT DOCUMENTS

| | | | |
|---|---|---|---|
| 3,932,236 A | 1/1976 | Wada et al. | |
| 12,065,712 B2 * | 8/2024 | Yamamoto | ............... H01F 1/18 |
| 2003/0180553 A1 | 9/2003 | Shigesato et al. | |
| 2003/0188806 A1 | 10/2003 | Fujii et al. | |

FOREIGN PATENT DOCUMENTS

| | | | |
|---|---|---|---|
| EP | 0 565 029 A1 | 10/1993 | |
| EP | 1698706 A1 | 9/2006 | |
| EP | 1818420 A1 * | 8/2007 | ........... C21C 7/0087 |
| EP | 2 537 958 A | 12/2012 | |
| ES | 2873149 T3 | 6/2018 | |
| JP | 49-96920 A | 9/1974 | |
| JP | 5-279747 A | 10/1993 | |
| JP | 6-184762 A | 7/1994 | |
| JP | 7-278833 A | 10/1995 | |
| JP | 9-78252 A | 3/1997 | |
| JP | 2002-309380 A | 10/2002 | |
| JP | 2002-322566 A | 11/2002 | |
| JP | 2002-348643 A | 12/2002 | |
| JP | 2002-363763 A | 12/2002 | |
| JP | 2003-171773 A | 6/2003 | |
| JP | 2003-313644 A | 11/2003 | |
| JP | 2004-342679 A | 12/2004 | |
| WO | WO 02/088403 A1 | 11/2002 | |

* cited by examiner

Primary Examiner — Kim S. Horger
(74) Attorney, Agent, or Firm — Birch, Stewart, Kolasch & Birch, LLP

(57) ABSTRACT

This grain-oriented electrical steel sheet includes a base steel sheet, an intermediate layer that is formed on a surface of the base steel sheet and mainly contains silicon oxide, and an insulation coating that is formed on the surface of the intermediate layer. A number density of the oxide particles in a region from the surface of the base steel sheet to a depth of 10 μm toward an inside of the base steel sheet is 0.020 oxide particles/μm² or less. In the grain-oriented electrical steel sheet, an area rate of an intermediate layer-remaining region n which the intermediate layer does not peel off but remains in a region in which the insulation coating peels off after a bend test performed using a mandrel according to JIS K 5600-5-1 (1999) is 20% or more.

3 Claims, No Drawings

GRAIN-ORIENTED ELECTRICAL STEEL SHEET, INTERMEDIATE STEEL SHEET FOR GRAIN-ORIENTED ELECTRICAL STEEL SHEET, AND METHODS FOR MANUFACTURING SAME

TECHNICAL FIELD

The present invention relates to a grain-oriented electrical steel sheet, an intermediate steel sheet for a grain-oriented electrical steel sheet, and methods for manufacturing the same.

Priority is claimed on Japanese Patent Application No. 2019-5200, filed in Japan on Jan. 16, 2019, the content of which is incorporated herein by reference.

BACKGROUND ART

Grain-oriented electrical steel sheets are used as iron core materials of transformers and the like. Grain-oriented electrical steel sheets are required to have magnetic properties such as a low iron loss.

Ordinarily, a coating is formed on the surface of a grain-oriented electrical steel sheet in order to reduce the iron, loss. This coating applies tension to the grain-oriented electrical steel sheet and thereby reduces the iron loss of the steel sheet as a single sheet. This coating also ensures an electrical insulating property between the grain-oriented electrical steel sheets at the time of using a laminate of the steel sheets as an iron core and thereby reduces the iron loss as the iron core.

As a grain-oriented electrical steel sheet on which a coating is formed, there is a grain-oriented electrical steel sheet in which a final-annealed film mainly containing forsterite ($Mg_2SiO_4$) is formed on a surface of a base steel sheet and, furthermore, an insulation coating is formed on the surface of the final-annealed film. That is, in this case, the coating on the base steel sheet includes the final-annealed film and the insulation coating. The final-annealed film and the insulation coating each have both functions of imparting an insulating property and of applying tension to the base steel sheet.

The final-annealed film mainly containing forsterite ($Mg_2SiO_4$) is formed by a reaction between an annealing separator mainly containing magnesia (MgO) and the base steel sheet occurring during a heat treatment in which the annealing separator and the base steel sheet are held at 600° C. to 1.200° C. for 30 hours or longer in final annealing that causes secondary recrystallization in the steel sheet.

The insulation coating is formed by, for example, applying a coating solution containing phosphoric acid or a phosphate, colloidal silica, and chromic anhydride or a chromate to the final-annealed steel sheet and baking and drying the coating solution at 300° C. to 950° C. for 10 seconds or longer.

In order for the insulation coating to exhibit the functions of imparting an insulating property and of applying tension to the base steel sheet, there is a demand for high adhesion between these coatings (the final-annealed film and the insulation coating) and the base steel sheet.

In the related art, the adhesion has been ensured mainly by an anchoring effect attributed to unevenness in the interface between the base steel sheet and the final-annealed film. However, this unevenness in the interface also serves as an, obstacle to domain wall motion occurring during the magnetization of grain-oriented electrical steel sheets. Therefore, this unevenness in the interface also serves as a cause for hindering the reduction of the iron loss of grain-oriented electrical steel sheets.

Since the formation of a final-annealed film such as a forsterite film causes unevenness in the interface between the base steel sheet and the final-annealed film, in order to reduce the iron loss, it is effective to suppress the formation of the final-annealed film and thereby smooth the surface of the base steel sheet.

For example, Patent Document 1 and Patent Document 2 propose techniques for smoothing the surface of the base steel sheet in the absence of a final-annealed film mainly containing forsterite in order to accelerate the reduction of the iron loss.

Specifically, Patent Document 1 discloses a method for manufacturing a grain oriented electrical steel sheet in which a final-annealed film is removed by pickling or the like and the surface of a base steel sheet is smoothed by chemical polishing or electric field polishing. In addition, Patent Document 2 discloses a method for manufacturing a grain-oriented electrical steel sheet in which the formation of a final-annealed film is suppressed using an annealing separator containing alumina ($Al_2O_3$) during final annealing to smooth the surface of a base steel sheet.

However, in the case of forming an insulation coating in contact with the smooth surface of a base steel sheet (directly on the surface of the base steel sheet) on which a final-annealed film is not formed as obtained by the technique of Patent Document 1 or Patent Document 2, there has been a problem in that it is difficult to make the insulation coating adhere to the surface of the base steel sheet (sufficient adhesion cannot be obtained).

Regarding such a problem, for example, Patent Document 3, Patent Document 4, Patent Document 5, and Patent Document 6 propose techniques for forming an intermediate layer (base coating) between the base steel sheet and the insulation coating in order to enhance the adhesion of the insulation coating to the smoothed surface of the base steel sheet.

Patent Document 3 discloses a method for forming an intermediate layer on the surface of a base steel sheet by applying an aqueous solution of a phosphate or an alkaline metal silicate to the surface of the base steel sheet. In addition, Patent Document 4 to Patent Document 6 disclose methods for forming an external oxidation-type silicon oxide film as an intermediate layer on a base steel sheet by performing a heat treatment at an appropriately controlled temperature in an appropriately controlled atmosphere for several tens of seconds to several minutes.

According to the intermediate layers proposed by Patent Document 3 to Patent Document 6, a certain degree of effect can be obtained in terms of the improvement of the adhesion of the insulation coating to the base steel sheet and the suppression of the reduction of the iron loss by smoothing unevenness in the interface between the base steel sheet and the coating. However, in recent years, there has been a demand for additional improvement in coating adhesion. Regarding such a demand, new techniques as described in Patent Document 7, Patent Document 8, Patent Document 9, Patent Document 10, Patent Document 11, and Patent Document 12 have been proposed.

Patent Document 7 discloses a technique for forming an externally oxidized granular oxide on the surface of a base steel sheet in addition to an externally oxidized film mainly containing silicon oxide. In addition, Patent Document 8 discloses a technique for controlling cavities in an externally oxidized layer mainly containing silicon oxide.

Patent Document 9 to Patent Document 11 disclose techniques for modifying an externally oxidized film mainly containing silicon oxide by containing metallic iron or a metallic oxide (for example, a Si—Mn—Cr oxide, a Si—Mn—Ca—Ti oxide, a Fe oxide, or the like) in the externally oxidized film.

Patent Document 12 discloses a grain-oriented electrical steel sheet having a multilayered intermediate layer including an oxide film mainly containing silicon oxide generated by an oxidation reaction and a coating layer mainly containing silicon oxide formed by application and baking.

As described above, grain-oriented electrical steel sheets in which an externally oxidized film mainly containing silicon oxide is used as an intermediate layer, thereby ensuring the adhesion of an insulation coating to a base steel sheet and having excellent magnetic properties even when the surface of the base steel sheet is smoothed have been proposed.

Meanwhile, in a case where a grain-oriented electrical steel sheet is used for a toroidal core, an EI core, or the like as an iron core of a transformer, the grain-oriented electrical steel sheet is worked (bent) to a desired shape. In addition, in the case of using a grain-oriented electrical steel sheet having an intermediate layer worked to a desired shape in a transformer, there is a case where an insulation coating peels off due to a reaction with moisture in the air, moisture in an oil in which the iron core is immersed, or the like. Therefore, for grain-oriented electrical steel sheets that are used fora toroidal core, an EI core, or the like as an iron core of a transformer, not only the adhesion of an insulation coating to a base steel sheet, but also water resistance are required.

However, among the techniques of the above-described grain-oriented electrical steel sheet having an intermediate layer mainly containing silicon oxide described in the patent documents, no documents mention the peeling of the insulation coating attributed to water.

CITATION LIST

Patent Document

Patent Document 1

Japanese, Unexamined Patent Application, First Publication No. S49-096920

Patent Document 2

International Publication WO 2002/088403

Patent Document 3

Japanese Unexamined Patent Application, First Publication No. H05-279747

Patent Document 4

Japanese Unexamined Patent Application, First Publication No. H06-184762

Patent Document 5

Japanese Unexamined Patent Application, First Publication No. H09-078252

Patent Document 6

Japanese Unexamined Patent Application, First Publication No. H07-278833

Patent Document 7

Japanese Unexamined Patent Application, First Publication No. 2002-322566

Patent Document 8

Japanese Unexamined Patent Application, First Publication No. 2002-363763

Patent Document 9

Japanese Unexamined Patent Application, First Publication No. 2003-313644

Patent Document 10

Japanese Unexamined Patent Application, First Publication No. 2003-171773

Patent Document 11

Japanese Unexamined Patent Application, First Publication No. 2002-348643

Patent Document 12

Japanese Unexamined Patent Application, First Publication No. 2004-342679

SUMMARY OF THE INVENTION

Problems to be Solved by the Invention

The present invention has been made in consideration of the above-described problems. An object of the present invention is to provide a grain-oriented electrical steel sheet having an intermediate layer mainly containing silicon oxide that has achieved the improvement of the adhesion of an insulation coating and the improvement of water resistance, which has not been recognized as a problem in the related art, an intermediate steel sheet for the grain-oriented electrical steel sheet, and methods for manufacturing the same.

Thee expression "water resistance is excellent" means that, when water is attached to the surface of the grain-oriented electrical steel sheet, it is possible to suppress the progress of peeling of the insulation coating attributed to corrosion.

Means for Solving the Problem

The gist of the present invention is as described below.
(1) A grain-oriented electrical steel sheet including abase steel sheet, an intermediate layer that is formed on a surface of the base steel sheet and mainly contains silicon oxide, and an insulation coating that is formed on a surface of the intermediate layer, in which a number density of oxide particles in a region from the surface of the base steel sheet to a depth of 10 μm toward an inside of the base steel sheet is 0.020 oxide particles/μm$^2$ or less, and an area rate of an intermediate layer-remaining region in which the intermediate layer does not peel off but remains in a region in which the insulation coating peels off after a bend test performed using a mandrel according to JIS K 5600-5-1 (1999) is 20% or more.

(2) A method for manufacturing a grain-oriented electrical steel sheet including a hot rolling process of heating a slab at 1280° C. or lower and then performing hot rolling to manufacture a hot-rolled steel sheet, a hot-band annealing process of performing hot band annealing on the hot-rolled steel sheet to manufacture an annealed steel sheet, a cold rolling process of performing cold rolling on the annealed steel sheet to manufacture a cold-rolled steel sheet, a decarburization annealing process of performing decarburization annealing on the cold-rolled steel sheet to manufacture a base steel sheet, an annealing separator applying process of applying an annealing separator having a composition containing 50 mass % or more of alumina ($Al_2O_3$) and, as a remainder, 0 to 50 mass % of magnesia (MgO) to the base steel sheet, a final annealing process of performing final annealing on the base steel sheet after the annealing separator applying process, a cooling process of cooling the base steel sheet after the final annealing process in an atmosphere having an oxidation degree $P_{H2O}/P_{H2}$, which is a ratio of a water vapor partial pressure to a hydrogen partial pressure, within a temperature range of 1100° C. to 500° C. set to 0.30 to 100000, an intermediate layer forming process of performing a heat treatment on the base steel sheet after the cooling process to form an intermediate layer mainly containing silicon oxide on a surface of the base steel sheet, and an insulation coating forming process of forming an insulation coating on a surface of the intermediate layer after the intermediate layer forming process.

(3) An intermediate steel sheet for a grain-oriented electrical steel sheet including a base steel sheet and a film-shaped oxide formed on a surface of the base steel sheet, in which the film-shaped oxide is present so as to cover the surface of the base steel sheet in a film shape, and a number density of the oxide particles in a region from an outermost surface of the base steel sheet to a depth of 10 μm toward an inside of the base steel sheet is 0.020 oxide particles/μm$^2$ or less.

(4) A method for manufacturing an intermediate steel sheet for a grain-oriented electrical steel sheet including a hot rolling process of heating a slab at 1280° C. or lower and then performing hot rolling to manufacture a hot-rolled steel sheet, a hot-band annealing process of performing hot band annealing on the hot-rolled steel sheet to manufacture an annealed steel sheet, a cold rolling process of performing cold rolling on the annealed steel sheet to manufacture a cold-rolled steel sheet, a decarburization annealing process of performing decarburization annealing on the cold-rolled steel sheet to manufacture a base steel sheet, an annealing separator applying process of applying an annealing separator having a composition containing 50 mass % or more of alumina ($Al_2O_3$) and, as a remainder, 0 to 50 mass % of magnesia (MgO) to the base steel sheet, a final annealing process of performing final annealing on the base steel sheet after the annealing separator applying process, and a cooling process of cooling the base steel sheet after the final annealing process in an atmosphere having an oxidation degree $P_{H2O}/P_{H2}$, which is a ratio of a water vapor partial pressure to a hydrogen partial pressure, within a temperature range of 1100° C. to 500° C. set to 0.30 to 100000.

Effects of the Invention

According to the present invention, it is possible to provide a grain-oriented electrical steel sheet having an intermediate layer mainly containing silicon oxide in which the adhesion of an insulation coating and the water resistance are favorable. In addition, it is possible to provide an intermediate steel sheet for a grain-oriented electrical steel, sheet and a method, for manufacturing the same.

Embodiment for Implementing the Invention

The present inventors performed studies regarding a method for solving the above-described problems.

In the beginning, the present inventors observed regions in which an insulation coating peeled off due to moisture in the air, moisture in an oil in which an iron core was to be immersed, or the like (hereinafter, referred to as insulation coating-peeling region). As a result, the present inventors noticed the fact that the structure of an insulation coating-peeling portion due to water and the structure of an insulation coating-peeling portion due to bending deformation have a correlation with each other.

Specifically, the correlation is as described below.

In the beginning, the present inventors performed the bend test regulated by JIS K 5600-5-1 (1999) on grain-oriented electrical steel sheets having an intermediate layer and an insulation coating. On the surfaces (the inner side surfaces of bent portions) of test pieces after the bend test, regions from which the insulation coating peeled off were observed using a scanning electron microscope (SEM). The observation results showed that, in the region from which the insulation coating peeled off (insulation coating-peeling region), there were a region in which the insulation coating peeled off but the intermediate layer remained (intermediate layer-remaining region) and a region in which the intermediate layer also peeled off together with the insulation coating, and the surface of the base steel sheet (base metal) was exposed (base steel sheet-exposed region).

Both the intermediate layer-remaining region and the base steel sheet-exposed region as described above also appeared in grain-oriented electrical steel sheets in which the insulation coating peeled off due to water. In addition, in a case where the insulation coating peeled off due to water, the total area of the base steel sheet-exposed region was larger than the total area of the intermediate layer-remaining region in the region in which the insulation coating peeled off.

Based on the above-described finding, the present inventors considered the peeling property of an insulation coating attributed to water in grain-oriented electrical steel sheets having an intermediate layer mainly containing silicon oxide as described below. In a case where a part of the insulation coating peels off due to bending or the like, as the proportion of the total area of the base steel sheet-exposed region in the insulation coating-peeling region increases, the progress rate of the peeling of the insulation coating due to water increases. That is, the peeling of the insulation coating due to water is further accelerated. The reason therefor is not clear, but is considered to be that, in the base steel sheet-exposed region, corrosion occurs due to the contact with water, and thus the peeling of the insulation coating is accelerated due to this corrosion. On the other hand, as the proportion of the total area of the intermediate layer-remaining region in the insulation coating-peeling region increases, the progress rate of the peeling of the insulation coating due to water decreases. In addition, the degree of peeling of the insulation coating due to water has a correlation with the proportion of the intermediate layer-remaining region n the insulation coating-peeling region at the time of performing the bend test regulated by JIS K 5600-5-1 (1999).

Furthermore, the present inventors performed studies regarding a method for increasing the area rate of the intermediate layer-remaining region in the insulation coating-peeling region after the bend test. At this time, the studies were performed with attention paid to a change in the adhesion between the base steel sheet and the intermediate layer by the control of the surface state of the base steel sheet on which the intermediate layer was still to be formed.

As a result, the present inventors found that, when an appropriate annealing separator is selected, furthermore, the atmosphere in a cooling procedure for final annealing is controlled, and the oxidation state of the surface of the base steel sheet is made to be appropriate at a point in time where the final annealing ends, the adhesion of the intermediate layer that is to be formed afterwards improves.

Specifically, the magnesia (MgO) content rate of the annealing separator is set to 50 mass % or less, whereby the presence of an internal oxidation-type oxide in the vicinity of the surface layer of the base steel sheet is prevented at least at a point in time where secondary recrystallization ends. The point in time where secondary recrystallization ends means a point in time where cooling for the final annealing begins.

Here, the internal oxidation type means a state in which an oxide does not penetrate the base steel sheet up to the surface of the base steel sheet and is present surrounded by the base steel sheet when observed on a cross section of the steel sheet. Examples of the internal oxidation-type oxide (hereinafter, also referred to as the internal oxide) include forsterite ($Mg_2SiO_4$), silica (Si—O), mullite (Al—Si—O), and the like. When the internal oxidation-type oxide is formed in the base steel sheet, the iron loss of the grain-oriented electrical steel sheet deteriorates.

Furthermore, regarding the atmosphere within a temperature range of 1100° C. to 500° C. in the cooling process of the final annealing, the oxidation degree ($P_{H_2O}/P_{H_2}$) represented by the ratio of the water vapor partial pressure to the hydrogen partial pressure is set within a range of 0.30 to 100000, and an external oxidation-type oxide is formed on the surface of the base steel sheet.

Here, the external oxidation-type does not mean a form of an oxide that intrudes into the inside of the base steel sheet, which is the internal oxidation type, but means a shape of an oxide that almost uniformly covers the surface of the base steel sheet, that is, a state in which an oxide covers the surface of the base steel sheet in a film shape. Therefore, hereinafter, there will be a case where the external oxidation-type oxide is also referred to as the film-shaped oxide. The external oxidation-type oxide is a compound of an element of the base steel sheet and oxygen. In the present embodiment, examples thereof include oxides such as iron oxides (FeO and $Fe_2O_3$) and fayalite (Fe—Si—O) having a laminar structure.

Technically, "internal oxidation" and "external oxidation" are not classified by the above-described forms, but classified by the oxidation mechanisms. However, in the invention, such classification is complicated, and it is also difficult to confirm the mechanisms after oxidation. Therefore, in the description of the present embodiment, the forms of oxides as a result of the above-described oxidation will be used for classification.

The reason for the area rate of the intermediate layer-remaining region in the insulation coating-peeling region after the bend test being increased by the control of the oxide on the surface of the final-annealed base steel sheet is not clear, but is considered as described below.

Ordinarily, the intermediate layer that is formed in an intermediate layer forming process is considered to be formed in a procedure in which the base steel sheet containing Si is oxidized. However, in a case where an oxide is already present on the surface of the final-annealed base steel sheet, there is a need to consider an influence of the reduction of the oxide on the intermediate layer. External oxidation-type oxides that are relatively slowly formed as the temperature lowers within a broad temperature range of 1100° C. to 500° C. after final annealing are considered to have a film shape and highly maintain continuousness between the base steel sheet and the oxides in terms of a concentration change of an element in the sheet thickness direction, the structural change, and the like. It is considered that the formation of the intermediate layer during the reduction of such an oxide makes the bonding structures of atoms between the surface of the base steel sheet and the intermediate layer stronger and improves the adhesion.

In a case where an oxide has a tendency of intruding into the base steel sheet, this oxide is not reduced during the formation of the intermediate layer, and an uneven shape remains in the interface between the base steel sheet and the intermediate layer. This uneven shape serves as an obstacle to domain wall motion when electrical steel sheets have been magnetized. Therefore, it is considered that the formation of an internal oxidation-type oxide needs to be avoided as much as possible.

A grain-oriented electrical steel sheet according to an embodiment of the present invention (grain-oriented electrical steel sheet according to the present embodiment), an intermediate steel sheet for a grain-oriented electrical steel sheet according to the present embodiment, and methods for manufacturing the same, which have been completed based on the above-described findings, will be described.

The grain-oriented electrical steel sheet according to the present embodiment includes a base steel sheet, an intermediate layer that is formed on a surface of the base steel sheet and mainly contains silicon oxide, and an insulation coating that is formed on the surface of the intermediate layer. The number density of oxide particles in a region from the surface of the base steel sheet to a depth of 10 μm toward the inside of the base steel sheet (a region from the surface of the base steel sheet as the starting point through a depth position of 10 μm in the depth direction (thickness direction) toward the inside as the ending point) is 0.020 oxide particles/μm$^2$ or less. In addition, the area rate of an intermediate layer-remaining region in which the intermediate layer does not peel off but remains in a region in which the insulation coating peels off after a bend test performed using a mandrel according to JIS K 5600-5-1 (1999) is 20% or more.

[Grain-Oriented Electrical Steel Sheet]

The grain-oriented electrical steel sheet according to the present embodiment is a steel sheet obtained by forming an intermediate layer and an insulation coating on an intermediate steel sheet for a grain-oriented electrical steel sheet.

In other words, the grain-oriented electrical steel sheet according to the present embodiment includes a base steel sheet and a coating that is formed in contact with a surface of the base steel sheet. This coating includes an intermediate layer that is formed in contact with the surface of the base steel sheet and an insulation coating that is formed in contact with the surface of the intermediate layer.

[Base Steel Sheet]

The grain-oriented electrical steel sheet according to the present embodiment has characteristics in the number density of oxide particles in the surface layer portion of the base steel sheet and the configuration of the coating (intermediate layer and insulation coating) that is formed on the surface of the base steel sheet.

Specifically, the number density of an oxide in a region from the surface of the base steel sheet to a depth of 10 µm toward the inside of the base steel sheet is 0.020 oxide particles/µm$^2$ or less. In the present embodiment, a state in which the number density of oxide particles is 0.020 oxide particles/µm$^2$ or less is expressed as "an internal oxide, is substantially not present". That is, an internal oxide, which is a state in which the oxide has intruded into the inside of the base steel sheet, is substantially not present in the surface layer portion (the region from the surface of the base steel sheet to a depth of 10 µm toward the inside of the base steel sheet) of the base steel sheet provided in the grain-oriented electrical steel sheet according to the present embodiment. When the number density of oxide particles in the region from the surface of the base steel sheet to a depth of 10 µm toward the inside of the base steel sheet is more than 0.020 oxide particles/µm$^2$, the iron loss of the grain-oriented electrical steel sheet deteriorates.

The number density of oxide (internal oxide) particles in the above-described region can be obtained by the following method. That is, the number density can be obtained by observing a cross section of the steel sheet perpendicular to a rolling direction with a scanning electron microscope (SEM) at a magnification of 5000 times or more and measuring the number density of oxide particles having a circle-equivalent diameter of 0.1 µm or more in the region that is 100 µm long in a direction parallel to the surface of the steel sheet and is 10 µm deep from the surface (outermost surface) of the base steel sheet toward the inside of the base steel sheet.

Furthermore, in the grain-oriented electrical steel sheet according to the present embodiment, the area rate of an intermediate layer-remaining region in which the intermediate layer does not peel off but remains in a region in which the insulation coating peels off after a bend test performed using a mandrel according to JIS K 5600-5-1 (1999) is 20% or more. The diameter of the mandrel is, for example, 10 to 16 mm.

When the base steel sheet is exposed, it is considered that the base steel sheet corrodes due to the contact with water and the peeling of the insulation coating further progresses. On the other hand, when the adhesion between the base steel sheet and the intermediate layer is favorable, the intermediate layer does not peel off but remains even in a region in which the insulation coating peeled off. That is, it is considered that, even when the insulation coating has peeled off, as long as the intermediate layer remains, it is possible to suppress the corrosion of the base steel sheet and to suppress the additional peeling of the insulation coating. Therefore, in the grain-oriented electrical steel sheet according to the present embodiment, the adhesion between the base steel sheet and the intermediate layer is enhanced.

Since the base steel sheet provided in the grain-oriented electrical steel sheet according to the present embodiment is controlled to a state in which the area rate of the intermediate layer-remaining region n which the intermediate layer does not peel off but remains in the region in which the insulation coating peels off after the bend test (hereinafter, expressed as intermediate layer residual rate in some cases) reaches 20% or more, the water resistance is excellent. When the area rate of the above-described intermediate layer-remaining region is less than 20%, the water resistance degrades. The intermediate layer residual rate may be 100%.

As long as the base steel sheet of the grain-oriented electrical steel sheet according to the present embodiment satisfies the number density of the internal oxide particles and the area rate of the intermediate layer-remaining region, the chemical composition and the structure are not particularly limited. For example, the base steel sheet of the present embodiment may be a base steel sheet in an ordinary gram-oriented electrical steel sheet. Hereinafter, an example of the base steel sheet of the grain-oriented electrical steel sheet according to the present embodiment will be described.

[Chemical Composition of Base Steel Sheet]

As the chemical composition of the base steel sheet of the grain-oriented electrical steel sheet according to the present embodiment, it is possible to use the chemical composition of a base steel sheet in an ordinary grain-oriented electrical steel sheet. The chemical composition of the base steel sheet contains, for example, the following elements. "%" used to express the amount of each element in the chemical composition of the base steel sheet indicates "mass %" unless particularly otherwise described. Numerical ranges expressed using "to" in the middle include the lower limit value and the upper limit value in the ranges.

The base steel sheet of the grain-oriented electrical steel sheet according to the present embodiment contains, for example, Si: 0.50% to 7.00%, C: 0.005% or less, and N: 0.0050% or less, and the remainder is made up of Fe and an impurity. Hereinafter, regarding a typical example of the chemical composition of the base steel sheet of the grain-oriented electrical steel sheet according to the present embodiment reasons for limiting the chemical composition will be described.

Si: 0.50% to 7.00%

Silicon (Si) increases the electrical resistance of the grain-oriented electrical steel sheet to decrease the iron loss. When the Si content is less than 0.50%, this effect cannot be sufficiently obtained. Therefore, the Si content is preferably 0.50% or more. The Si content is more preferably 1.50% or more and still more preferably 2.50% or more.

On the other hand, when the Si content exceeds 7.00%, the saturation magnetic flux density of the base steel sheet decreases, and the iron loss of the grain-oriented electrical steel sheet deteriorates. Therefore, the Si content is preferably 7.00% or less. The Si content is more preferably 5.50% or less and still more preferably 4.50% or less.

C: 0.005% or less

Carbon (C) forms a compound in the base steel sheet and deteriorates the iron loss of the grain-oriented electrical steel sheet. Therefore, the C content is preferably 0.005% or less. The C content is more preferably 0.004% or less and still more preferably 0.003% or less.

The C content is preferably as small as possible and thus may be 0%, but there is a case where C is contained in steel as an impurity. Therefore, the C content may be more than 0%.

N: 0.0050% or less

Nitrogen (N) forms a compound in the base steel sheet and deteriorates the iron loss of the grain-oriented electrical steel sheet. Therefore, the N content is preferably 0.0050% or less. The N content is more preferably 0.0040% or less and still more preferably 0.0030% or less.

The N content is preferably as small as possible and thus may be 0%, but there is a case where N is contained in steel as an impurity. Therefore, the N content may be more than 0%.

The remainder of the chemical composition of the base steel sheet is made up of Fe and an impurity. The "impurity" mentioned herein refers to an element that comes from a component contained in a raw material or a component being mixed in a manufacturing procedure at the time of industrially manufacturing the base steel sheet and has no substantial influence on an effect that is obtained by the grain-oriented electrical steel sheet according to the present embodiment.

[Optional Elements]

Basically, the chemical composition of the base steel sheet contains the above-described elements with the remainder made up of Fe and an impurity, but may contain one or more optional elements instead of some of Fe for the purpose of improving the magnetic characteristics or solving problems relating to manufacturing. Examples of the optional elements that are contained instead of some of Fe include the following elements. Since these elements may not be contained, the lower limits are 0%. On the other hand, when the amounts of these elements are too large, a precipitate is generated, thereby deteriorating the iron loss of the grain-oriented electrical steel sheet or ferrite transformation is suppressed to prevent the sufficient obtainment of a Goss orientation or to decrease the saturation magnetic flux density, thereby deteriorating the iron loss of the grain-oriented electrical steel sheet. Therefore, even in a case where these elements are contained, the contents are preferably set within the following ranges.

Acid-soluble Al: 0.0065% or less,
Mn: 1.00% or less,
S and Se: 0.001% or less in total,
Bi: 0.010% or less,
B: 0.0080% or less,
Ti: 0.015% or less,
Nb: 0.020% or less,
V: 0.015% or less,
Sn: 0.50% or less,
Sb: 0.50% or less,
Cr: 0.30% or less,
Cu: 0.40% or less,
P: 0.50% or less,
Ni: 1.00% or less, and
Mo: 0.10% or less.

"S and Se: 0.001% or less in total" means that the base steel sheet may contain any one of S or Se alone and the amount of any one of S or Se may be 0.001% or less or the base steel sheet may contain both S and Se and the amount of S and Se may be 0.001% or less in total.

The above-described chemical composition of the base steel sheet of the grain-oriented electrical steel sheet according to the present embodiment is obtained by adopting a method for manufacturing the grain-oriented electrical steel sheet according to the present embodiment using a slab having a chemical composition described below.

The chemical composition of the base steel sheet of the grain-oriented electrical steel sheet according to the present embodiment is preferably measured using spark optical emission spectrometry (Spark-OES). In addition, in the case of a small content, the content may be measured using inductively coupled plasma-mass spectrometry (ICP-MS) as necessary. Acid-soluble Al may be measured by ICP-MS using a filtrate obtained by hydrolyzing a specimen with an acid. In addition, C and S may be measured using an infrared absorption method after combustion, and N may be measured using, an inert gas fusion thermal conductivity method.

[Roughness of Surface of Base Steel Sheet]

The roughness of the surface of the base steel sheet is not particularly limited. However, when unevenness is formed on the surface of the base steel sheet, there is a case where an iron loss reduction action is hindered. In order to avoid such hindrance of the iron loss reduction action, for example, the roughness of the surface of the base steel sheet is preferably 1.0 μm or less in terms of the arithmetic average roughness (Ra). A more preferable upper limit of the arithmetic average roughness Ra of the surface of the base steel sheet is 0.8 μm, and a still more preferable upper limit is 0.6 μm. The lower limit of the arithmetic average roughness Ra of the surface of the base steel sheet may be set to 0.001 μm.

The arithmetic average roughness Ra of the surface of the base steel sheet is measured by the following method.

A sample is collected in a manlier that across section of the grain-oriented electrical steel sheet perpendicular to a rolling direction is used as an observation surface. The roughness of the surface of the base steel sheet is measured on the obtained observation surface. Specifically, the positional coordinates of the surface of the base steel sheet in the sheet thickness direction are measured with a precision of 0.01 μm or more in the interface between the base steel sheet and the intermediate layer on the observation surface (cross section) in a case where a coating such as a final-annealed film or the intermediate layer is formed on the surface of the base steel sheet or on the observation surface (cross section) in a case where no coating is formed and the surface of the base steel sheet is exposed, and the arithmetic average roughness Ra is calculated according to JIS B 0601 (2001). The positional coordinates are measured in a continuous 2 mm range at 0.1 μm pitches in a direction parallel to the surface of the base steel sheet (20000 points in total), and the arithmetic average roughness Ra is obtained with a standard length set to 2 mm. The arithmetic average roughness Ra is obtained by the above-described method in at least five arbitrary places on the surface of the base steel sheet, and the average value of the Ra values obtained in the respective places is defined as the arithmetic average roughness Ra of the surface of the base steel sheet. This observation can be performed with a SEM, and it is practical to apply image processing for the measurement of the positional coordinates.

[Intermediate Layer]

The intermediate layer is formed in contact with the surface of the base steel sheet on which the internal oxide is substantially not present. The intermediate layer is an externally oxidized film mainly containing silicon oxide. Here, the expression "mainly containing silicon oxide" means that, as the composition of the intermediate layer, a Fe content of less than 30% by atom, a P content of less than 5% by atom, a Si content of less than 50% by atom and 20% by atom or more, an O content of less than 80% by atom and 50% by atom or more, and a Mg content of 10% by atom or less are satisfied.

The intermediate layer is a layer that is disposed between the base steel sheet and the insulation coating and is effective for making the base steel sheet and the insulation coating adhere to each other. The intermediate layer is formed by, for example, as described in manufacturing processes described below, reducing a film-shaped oxide formed by performing a specific cooling process in a final annealing process.

Silicon oxide that is the main component of the intermediate layer is preferably SiOx (x=1.0 to 2.0) and more preferably SiOx (x=1.5 to 2.0). This is because silicon oxide is more stable. When a heat treatment for forming silicon oxide on the surface of the base steel sheet is sufficiently performed, it is possible to form silica ($SiO_2$).

In the intermediate layer formed by performing a heat treatment on the base steel sheet under conditions in which the base steel sheet is held within a temperature range of 600° C. to 1150° C. for 10 to 600 seconds in an atmosphere containing 20 to 50 volume % of hydrogen with a remainder made up of nitrogen and an impurity and having a dew point of −20° C. to 2° C., silicon oxide is present in an amorphous state. The intermediate layer mainly containing amorphous silicon oxide formed under these heat treatment conditions is an intermediate layer that has a high strength enough to withstand thermal stress and is made of a dense material that has a relatively small elastic modulus to be capable of easily relaxing thermal stress, which is preferable.

The base steel sheet of the grain-oriented electrical steel sheet contains Si in a high concentration (for example, Si: 0.50 to 7.00 mass %). Therefore, a strong chemical affinity is developed between the intermediate layer mainly containing silicon oxide and the base steel sheet, and the intermediate layer and the base steel sheet adhere to each other more strongly.

The thickness of the intermediate layer is not particularly limited. When the thickness is 2 nm or more, since the adhesion of the insulation coating to the base steel sheet is effectively enhanced, the thickness of the intermediate layer is preferably 2 nm or more and more preferably 5 nm or more. When the thickness of the intermediate layer is 400 nm or less, a defect such as a void or a crack in the intermediate layer is effectively suppressed. Therefore, the thickness of the intermediate layer is preferably 400 nm or less and more preferably 300 nm or less. The intermediate layer is made as thin as possible as long as it is possible to ensure the coating adhesion, whereby it is possible to contribute to the enhancement of productivity by shortening the formation time and to suppress a decrease, in the space factor at the time of using the grain-oriented electrical steel sheet as an iron core. Therefore, the thickness of the intermediate layer is still more preferably 100 nm or less and far still, more preferably 50 nm or less.

The method for measuring the thickness of the intermediate layer is as described below.

The thickness is measured by observing a cross section of the intermediate layer with a transmission electron microscope (TEM) in which, the diameter of an electron beam is set to 10 nm. Specifically, for example, a specimen is cut out for TEM observation so as to have an observation cross section parallel to the sheet thickness direction, in the observation cross section of the specimen, five or more measurement positions that are 2 μm or more apart from each other in the width direction are selected from a measurement region that is 10 μm or more wide in a direction, parallel to the surface of the base steel sheet and includes the intermediate layer, the above-described base steel sheet, and the insulation coating described below, and the thicknesses of the intermediate layer are measured with TEM. The average of the measured values is regarded as the thickness of the intermediate layer. In the case of measuring the thickness of the intermediate layer at each measurement position in the measurement region with a TEM, a layer that is present between the base steel sheet and the insulation coating is measured as the intermediate layer.

[Insulation Coating]

The insulation coating is formed on the surface of the intermediate layer. As the insulation coating, it is possible to use a well-known insulation coating. As an example, the insulation coating is made of a compound mainly containing P, O, and Si and may contain Cr. The insulation coating applies tension to the base steel sheet to reduce the iron loss of the steel sheet as a single sheet. Furthermore, the insulation coating ensures an electrical insulating property between the grain-oriented electrical steel sheets at the time of using a laminate of the grain-oriented electrical steel sheets.

When the insulation coating becomes thin, since tension that is applied to the base steel sheet becomes small, and the insulating property also degrades, the thickness of the insulation coating is preferably 0.1 μm or more and more preferably 0.5 μm or more. On the other hand, when the thickness of the insulation coating exceeds 10 μm, since there is a concern that a crack may be generated in the insulation coating in an insulation coating-forming stage, the thickness of the insulation coating is preferably 10 μm or less and more preferably 5 μm or less.

The thickness of the insulation coating can be measured by observing a cross section of the insulation coating (or grain-oriented electrical steel sheet) with a transmission electron microscope (TEM). As a specific measurement method, the same method as the method for measuring the thickness of the intermediate layer may be used.

On the insulation coating, a magnetic domain refining treatment for forming a local fine strain region or groove may be performed with a laser or plasma or by a mechanical method, etching, or other methods as necessary.

[Characteristics of Coating Structure of Grain-Oriented Electrical Steel Sheet]

In the grain-oriented electrical steel, sheet according to the present embodiment, the area rate of the intermediate layer-remaining region in which the intermediate layer does not peel off but remains in the region in which the insulation coating peels off after a bend test performed using a mandrel according to JIS K 5600-5-1 (1.999) is controlled to be 20% or more. Therefore, in the case of performing a bend test according to JIS K 5600-5-1 (1999), the area rate of the intermediate layer-remaining region in which the intermediate layer does not peel off but remains in the region in which the insulation coating peels off reaches 20% or more. The above-described area rate of the intermediate layer-remaining region is preferably 30% or more and more preferably 40% or more. The intermediate layer residual rate may be 100%.

The area rate of the intermediate layer-remaining region is obtained by the following method.

A rectangular sample that is 10 mm long in a direction perpendicular to a rolling direction of the grain-oriented electrical steel sheet and 150 mm long in a direction parallel to the rolling direction is collected. In a test piece, the observation surface of the 10 mm×150 mm sample is regarded as a surface including the coating. A bend test is cording to JIS K 5600-5-1 (1999). Specifically, the collected sample is coiled around a round bar (mandrel) having a diameter of 10 to 16 mm and bent 180°. The bent test piece is bent back.

The observation surface after the bend test (the inner side surface of the bent portion) is observed with a COMPO image of a SEM, and a region in which the insulation coating peeled off (insulation coating-peeling region) in the observation surface is specified. Specifically, the COMPO image of the observation surface is converted to a monochromatic image with 256 levels of grayscale, and a region having a grayscale level of 50% or less from the white side is determined as the region in which the insulation coating peels off. The total area of the specified insulation coating-peeling region is obtained.

The evaluation area of insulation coating peeling in the bend test is defined by the following expression. In a case where the insulation coating peeling area is less than 5% of the evaluation area, the insulation coating peeling area is re-evaluated by decreasing the bending diameter (using a mandrel having a small diameter). As a result of the re-evaluation, in a case where the insulation coating peeling area is 5% or more of the evaluation area, the area rate of the intermediate layer-remaining region is obtained.

(Evaluation area of insulation coating peeling)=(diameter of mandrel)×(ratio of circumference to diameter)÷2

Furthermore, the insulation coating-peeling region in the observation surface is mapped using an energy dispersive X-ray spectroscope (SEM-EDS), and a Si concentration distribution by atom % is obtained. In the obtained Si concentration distribution, the maximum value of the Si concentration and the minimum value of the Si concentration are specified. A region that satisfies the following expression is defined as the intermediate layer-remaining region.

(Si concentration of region)>{(maximum value of Si concentration)+(minimum value of Si concentration)}/2

In a case where the maximum value of the Si concentration and the minimum value of the Si concentration satisfy the following expression, the area rate of the intermediate layer-remaining region is regarded as 0%.

(Maximum value of Si concentration)−(minimum value of Si concentration)<5 atom %

The proportion of the total area of the intermediate layer-remaining region in the observation surface in the EDS mapping total area of the insulation coating-peeling region (coating peeling portion) is defined as the area rate (%) of the intermediate layer remaining region. That is, the area rate of the intermediate layer-remaining region is defined by the following expression.

Area rate of intermediate layer-remaining region= (total area of intermediate layer-remaining region)/(EDS mapping total area)×100

Here, the EDS mapping total area is set to 15 mm² or more. In a case where the area of the coating peeling portion is not sufficient in one test piece, the area rate of the intermediate layer-remaining region may be calculated as the average value obtained using a plurality of test pieces.

When the area rate of the intermediate layer-remaining region in which the intermediate layer does not peel off but remains in the region in which the insulation coating peels off after a bend test performed using a mandrel according to JIS K 5600-5-1 (1999) is 20% or more, the adhesion of the intermediate layer to the base steel sheet is sufficiently high. Therefore, in this case, since the base steel sheet is covered with the intermediate layer even in a state in which a part of the insulation coating peeled off, it is possible to suppress the progress of the peeling of the insulation coating attributed to corrosion occurring when water is attached to the surface of the steel sheet. That is, it is possible to enhance the water resistance of the grain-oriented electrical steel sheet.

[Regarding Intermediate Steel Sheet for Grain-Oriented Electrical Steel Sheet]

An intermediate steel sheet for a grain-oriented electrical steel sheet according to the present embodiment includes a base steel sheet and a film-shaped oxide formed on a surface of the base steel sheet. The film-shaped oxide is present so as to cover the surface of the base steel sheet in a film shape. In addition, in the base steel sheet, the number density of oxide (internal oxide) particles present in the base steel sheet in a region from the surface of the base steel sheet to a depth of 10 μm toward the inside of the base steel sheet is 0.020 oxide particles/μm² or less.

This intermediate steel sheet is a steel sheet that is used to manufacture the grain-oriented electrical steel sheet according to the present embodiment and is a final-annealed steel sheet (more specifically, a steel sheet after a cooling process and before an intermediate layer forming process described below). With respect to this intermediate steel sheet, the intermediate layer mainly containing silicon oxide is formed on the surface of the base steel sheet, and furthermore, the insulation coating is formed on the surface of the intermediate layer, whereby the grain-oriented electrical steel sheet according to the present embodiment is obtained.

In the intermediate steel sheet for a grain-oriented electrical steel sheet according to the present embodiment, an internal oxide, which is a state in which the oxide has intruded into the inside of the base steel sheet, is substantially not present on the surface of the base steel sheet. In a case where an internal oxide is present after final annealing, the internal oxide is not reduced during the formation of the intermediate layer, and the internal oxide remains on the surface of the base steel sheet. This internal oxide serves as an obstacle to domain wall motion when the grain-oriented electrical steel sheet has been magnetized, and the iron loss of the grain-oriented electrical steel sheet deteriorates.

On the other hand, a film-shaped oxide formed by external oxidation, which covers the surface of the base steel sheet in a film shape, is present on the surface of the base steel sheet.

The expression "the internal oxide is substantially not present" specifically indicates that the number density of oxide particles in a region from the surface (outermost surface) of the base steel sheet to a depth of 10 μm in the sheet thickness direction toward the inside of the base steel sheet (a region from the surface of the base steel sheet as the starting point through a depth position of 10 μm in the depth direction (thickness direction) toward the inside as the ending point) is 0.020 oxide particles/μm² or less. The number density of oxide particles in this region can be obtained by observing a cross section of the steel sheet with a scanning electron microscope (SEM) at a magnification of 5000 times or more and measuring the number density of oxide particles having a circle-equivalent diameter of 0.1 μm or more in the region that is 100 μm long in a direction parallel to the surface of the steel sheet and is 10 μm deep from the surface of the base steel sheet toward the inside of the base steel sheet.

This number density of the internal oxide particles does not change even when the intermediate layer and the insulation coating are formed.

The oxide is configured in a film shape that covers the entire surface of the base steel sheet by adjusting the conditions of a cooling process after final annealing. Specifically, the base steel sheet is cooled in the cooling process after final annealing, and the oxide is obtained by cooling the base steel sheet in an atmosphere in which the oxidation degree ($P_{H2O}/P_{H2}$) represented by the ratio of the water vapor partial pressure to the hydrogen partial pressure is set to 0.30 to 100000 within a temperature range in which the base steel sheet reaches 1100° C. to 500° C. When the oxidation degree is 0.30 to 100000, the film-shaped oxide has a hierarchical structure and uniformly covers the surface of the base steel sheet. As a result, an intermediate layer having a strong bond with the base steel sheet is formed in the next process, and it is considered that the adhesion of the insulation coating is enhanced.

The film-shaped oxide after final annealing is mainly iron oxides (FeO and $Fe_2O_3$) and fayalite (Fe—Si—O). Therefore, it is considered that, in an atmosphere in the next process in which the intermediate layer is mainly formed, Fe in the iron oxides is reduced, and this film-shaped oxide turns into an intermediate layer mainly containing external oxidation-type silicon oxide.

Next, a method for manufacturing a grain-oriented electrical steel sheet according to the present embodiment and a method for manufacturing an intermediate steel sheet for a grain-oriented electrical steel sheet according to the present embodiment will be described.

The coatings (intermediate layer and insulation coating) having the above-described characteristics can be manufactured by, for example, manufacturing methods described below.

The intermediate steel sheet for a grain-oriented electrical steel sheet according to the present embodiment is obtained by a manufacturing method including the following processes (S0) to (S62).
 (S0) Preparation process
 (S1) Hot rolling process
 (S2) Hot-band annealing process
 (S3) Cold rolling process
 (S4) Decarburization annealing process
 (S5) Annealing separator applying process
 (S61) Final annealing process
 (S62) Cooling process The grain-oriented electrical steel sheet according to the present embodiment is obtained by a manufacturing method including the processes (S0) to (S62) and, furthermore, processes (S7) and (S8).
 (S7) Intermediate layer forming process
 (S8) Insulation coating forming process
Hereinafter, each process will be described.

[S0: Preparation Process]

In the preparation process, a slab is prepared. The method for manufacturing the slab is not particularly limited, and the following method is an exemplary example.

Molten steel is manufactured (smelting). The slab is manufactured using the molten steel. The slab may be manufactured by the continuous casting method. The slab may be manufactured by manufacturing an ingot using molten steel and blooming the ingot. The slab may be manufactured by a different method. The thickness of the slab is not particularly limited. The thickness of the slab is, for example, 150 to 350 mm. The thickness of the slab is preferably 220 to 280 mm. As the slab, a so-called thin slab having a thickness of 10 to 70 mm may be used. In the case of using a thin slab, it is possible to skip rough rolling before final rolling in the hot rolling process.

[Chemical Composition of Slab]

In order to obtain the chemical composition of the base steel sheet in an ordinary grain-oriented electrical steel sheet, the chemical composition of the slab can be set to, for example, the following ranges in consideration of the contents or the like that change in the middle of manufacturing from the slab to the grain-oriented electrical steel sheet. "%" used to express the amount of each element in the chemical composition of the slab indicates "mass %" unless particularly otherwise described. Numerical limitation ranges expressed using "to" in the middle include the lower limit value and the upper limit value in the ranges.

Si: 0.80% to 7.00%,
C: 0.085% or less,
Acid-soluble Al: 0.010% to 0.065%,
N: 0.0040% to 0.0120%,
Mn: 0.05% to 1.00%,
S and Se: 0.003% to 0.015% in total, and
Remainder: Fe and impurity
Hereinafter, each element will be described.
Si: 0.80 to 7.00%

Silicon (Si) increases the electrical resistance of the grain-oriented electrical steel sheet to decrease the iron loss. When Si content is less than 0.80%, γ transformation occurs during final annealing, and the crystal orientation of the grain-oriented electrical steel sheet is impaired.

On the other hand, when the Si content exceeds 7.00%, cold workability degrades, and a crack is likely to be generated during cold rolling. Therefore, a preferable Si content is 0.80% to 7.00%. The Si content is more preferably 2.00% or more and still more preferably 2.50% or more. In addition, the Si content is more preferably 4.50% or less and still more preferably 4.00% or less.

C: 0.085% or less

Carbon (C) is inevitably contained. C is an effective element for controlling primary recrystallization structures, but adversely affects the magnetic characteristics. Therefore, the C content is preferably 0.085% or less. The C content is preferably as small as possible.

However, in the case of taking the productivity in industrial production into account, the C content is preferably 0.020% or more and more preferably 0.040% or more.

C is purified in the decarburization annealing process and the final annealing process, which will be described below, and the C content reaches 0.005% or less after the final annealing process.

Acid-soluble Al: 0.010% to 0.065%

Acid-soluble aluminum (Al) bonds to N to be precipitated as (Al, Si)N and functions as an inhibitor. In a case where the acid-soluble Al content is 0.010% to 0.065%, secondary recrystallization is stabilized. Therefore, the acid-soluble Al content is preferably 0.010% to 0.065%. The acid-soluble Al content is more preferably 0.015% or more and still more preferably 0.020% or more. From the viewpoint of the stability of secondary recrystallization, the acid-soluble Al content is more preferably 0.045% or less and still more preferably 0.035% or less.

When remaining after final annealing, acid-soluble Al forms a compound and deteriorates the iron loss of the grain-oriented electrical steel sheet. Therefore, it is preferable to decrease the amount of acid-soluble Al that is contained in the final-annealed steel sheet as much as possible by purification during final annealing. Depending on the conditions of final annealing, there is a case where the final-annealed steel sheet contains no acid-soluble Al.

N: 0.0040% to 0.0120%

Nitrogen (N) bonds to Al to function as an inhibitor. When the N content is less than 0.0040%, a sufficient amount of an inhibitor is not generated. The N content is more preferably 0.0050% or more and still more preferably 0.0060% or more.

On the other hand, when the N content exceeds 0.0120%, a blister, which is one kind of defect is likely to be generated in the steel sheet. Therefore, a preferable N content is 0.0040% to 0.0120%. The N content is more preferably 0.0110% or less and still more preferably 0.0100% or less.

N is purified in the final annealing process, and the N content reaches 0.0050% or less after the final annealing process.

Mn: 0.05% to 1.00%

Manganese (Mn) bonds to S or Se to generate MnS or MnSe and functions as an inhibitor. In a case where the Mn content is within a range of 0.05% to 1.00%, secondary recrystallization is stabilized. Therefore, a preferable Mn content is 0.05% to 1.00%. The Mn content is preferably 0.06% or more and more preferably 0.07% or more.

In addition, the Mn content is more preferably 0.50% or less and still more preferably 0.20% or less.

Depending on the conditions of final annealing, there is a case where the final-annealed steel sheet contains no Mn.

S and Se: 0.003% to 0.015% in total

Sulfur (S) and selenium (Se) bond to Mn to generate MnS or MnSe and function as an inhibitor. When the amount of S and Se is 0.003% to 0.015% in total, secondary recrystallization is stabilized. Therefore, a preferable amount of S and Se is 0.003% to 0.015% in total.

When remaining after final annealing, S and Se form a compound and deteriorate the iron loss of the grain-oriented electrical steel sheet. Therefore, it is preferable to decrease the amount of S and Se that are contained in the final-annealed steel, sheet as much as possible by purification during final annealing. Depending on the conditions of final annealing, there is a case here the final-annealed steel sheet contains no S and Se.

Here, "the amount of S and Se is 0.003% to 0.015% in total" means that the slab may contain any one of S or Se alone and the amount of any one of S or Se may be 0.003% to 0.015% or the slab may contain both S and Se and the amount of S and Se may, be 0.003% to 0.015% in total.

The remainder in the chemical composition of the slab that is used to manufacture the grain-oriented electrical steel sheet according to the present embodiment is made up of Fe and an impurity. The "impurity" mentioned herein refers to an element that comes from a component contained in a raw material or a component being mixed in a manufacturing procedure at the time of industrially manufacturing the base steel sheet of the grain-oriented electrical steel sheet according to the present embodiment and has no substantial adverse influence on an effect that is obtained by the grain-oriented electrical steel sheet according to the present embodiment.

[Optional Elements]

In consideration of the strengthening of the inhibitor function or the influence on the magnetic properties attributed to the formation of a compound, the chemical composition of the slab may contain one or more optional elements instead of some of Fe. Examples of the optional elements that are contained instead of some of Fe include the following elements. These elements are optional elements and may not be contained, and thus the lower limits thereof are 0%.

Bi: 0.010% or less,
B: 0.080% or less,
Ti: 0.015% or less,
Nb: 0.20% or less,
V: 0.15% or less,
Sn: 0.50% or less,
Sb: 0.50% or less,
Cr: 0.30% or less,
Cu: 0.40% or less,
P: 0.50% or less,
Ni: 1.00% or less, and
Mo: 0.10% or less.

[S1: Hot Rolling Process]

In the hot rolling process, hot rolling is performed on the prepared slab using a hot rolling mill to manufacture a steel sheet (hot-rolled steel sheet).

Specifically, first the slab is heated. During heating, for example, the slab is charged into a well-known heating furnace or a well-known soaking furnace and heated. A preferable heating temperature of the slab is 1280° C. or lower. The heating temperature of the slab is set to 1280° C. or lower, whereby it is possible to avoid a variety of problems generated in the case of heating the slab at, for example, a temperature higher than 1280° C. (a necessity of a designated heating furnace, a large amount of molten scale, and the like). A preferable upper limit of the heating temperature of the slab is 1250° C. The heating time of the slab may be set to 40 to 120 minutes.

The lower limit value of the heating temperature of the slab is not particularly limited. However, in a case where the heating temperature is too low, there is a case where hot rolling becomes difficult and the productivity degrades. Therefore, the heating temperature may be set within a range of 1280° C. or lower in consideration of the productivity. A preferable lower limit of the heating temperature of the slab is 1100° C.

It is also possible to begin hot rolling before the temperature of the slab lowers after casting without performing the slab heating process.

Hot rolling is performed on the heated slab using a hot rolling mill to manufacture a hot-rolled steel sheet. The hot rolling mill includes, for example, a rough rolling mill and a final rolling mill disposed downstream of the rough rolling mill. The rough rolling mill includes rough rolling stands arranged in a row. Each rough rolling stand includes a plurality of rolls disposed vertically. The final rolling mill also, similarly, includes final rolling stands arranged in a row. Each final rolling stand includes a plurality of rolls disposed vertically. Heated steel is rolled with the rough rolling mill and then further rolled with the final rolling mill, thereby manufacturing a hot-rolled steel sheet.

The thickness of the hot-rolled steel sheet that is manufactured by hot rolling is not particularly limited. The thickness of the hot-rolled steel sheet is, for example, 3.5 mm or less.

The final temperature in the hot rolling process (the temperature of the steel sheet on the outlet side of the final rolling stand that rolls the steel sheet at the end in the final rolling mill) is, for example, 900° C. to 1000° C.

The hot-rolled steel sheet is manufactured by the above-described hot rolling process.

[S2: Hot-Band Annealing Process]

In the hot-band annealing process, hot band annealing is performed on the hot-rolled steel sheet obtained by the hot rolling process to obtain an annealed steel sheet.

As the conditions of the hot band annealing, well-known conditions may be used. For example, the annealing temperature (the furnace temperature in a hot band annealing furnace) in the hot band annealing is 750° C. to 1200° C. The holding time at the annealing temperature is, for example, 30 to 600 seconds.

[S3: Cold Rolling Process]

In the cold rolling process, cold rolling is performed on the annealed steel sheet after the hot band annealing.

In the cold rolling process, cold rolling may be performed only once or may be performed a plurality of times. In the case of performing the cold rolling a plurality of times, it is also possible to perform cold rolling, then, perform intermediate annealing for the purpose of softening, and then perform cold rolling again. As the intermediate annealing conditions, a well-known method may be used.

A pickling treatment may be performed on the annealed steel sheet before cold rolling is performed on the annealed steel sheet.

In the case of performing the cold rolling process a plurality of times without performing an intermediate annealing process, there is a case where it is difficult to obtain uniform characteristics in the manufactured grain-oriented electrical steel sheet. On the other hand, in the case of performing the cold rolling process a plurality of times with an intermediate annealing process performed therebetween, there is a case where the magnetic flux density decreases in the manufactured grain-oriented electrical steel sheet. Therefore, the number of times of the cold rolling process and the presence or absence of the intermediate annealing process are determined depending on characteristics demanded for the finally manufactured grain-oriented electrical steel sheet and the manufacturing costs.

In the cold rolling performed once or a plurality of times, the cumulative cold rolling reduction (cumulative rolling reduction) is preferably 80% or larger and more preferably 90% or larger. A preferable upper limit of the cumulative cold rolling reduction is 95%. Here, the cumulative cold rolling reduction (%) is defined as described below.

Cumulative cold rolling reduction (%)=(1−sheet thickness of cold-rolled steel sheet after final cold rolling/sheet thickness of annealed steel sheet before beginning of initial cold rolling)× 100

The cold-rolled steel sheet obtained by the cold rolling process is wound in a coil shape. The sheet thickness of the cold-rolled steel sheet is not particularly limited, but is preferably set to 0.35 mm or less and more preferably set to 0.30 mm or less in order to further reduce the iron loss.

[S4: Decarburization Annealing Process]

In the decarburization annealing process, decarburization annealing is performed on the cold-rolled steel sheet obtained, by the cold rolling process.

The decarburization annealing is performed by, for example, the following method. The cold-rolled steel sheet is charged into a heat treatment furnace. The temperature of the heat treatment furnace (decarburization annealing temperature) is held at, for example, 800° C. to 950° C. for 30 to 180 seconds, and the atmosphere of the heat treatment furnace is set to a wet atmosphere containing hydrogen and nitrogen.

Decarburization annealing is performed under the above-described conditions, thereby developing primary recrystallization and removing carbon in the steel sheet from the steel sheet.

[S5: Annealing Separator Applying Process]

In the annealing separator applying process, an annealing separator is applied to the surface of the decarburization-annealed base steel sheet. In ordinary methods for manufacturing a grain-oriented electrical steel sheet, an annealing separator containing 90 mass % or more of MgO is used. However, in this case, a glass film having an uneven shape is formed on the surface of the steel sheet. The formation of a glass film having an uneven shape deteriorates iron losses. Therefore, in the method for manufacturing a grain-oriented electrical steel sheet according to the present embodiment, an annealing separator having a composition containing 50 mass % or more of alumina ($Al_2O_3$) with a remainder of 0 to 50 mass % of magnesia (MgO) is used as the annealing separator. When the MgO content is 50 mass % or less, it is possible to suppress the formation of an internal oxide that serves as a cause for an uneven shape in the interface with the steel sheet while forming the film-shaped oxide. A preferable upper limit of MgO in the annealing separator is 45 mass % and a more preferable upper limit is 40 mass %.

A preferable lower limit of MgO is 10 mass % and a more preferable lower limit is 15 mass %. When the MgO content is 10 mass % or more, it is possible to suppress the formation of mullite (Al—Si—O), which is a kind of internal oxide. Therefore possible to suppress the deterioration of iron losses due to internal oxides.

$Al_2O_3$ may be set to 100 mass %. In addition, $Al_2O_3$ may be set to 90 mass % or less or 85 mass % or less. Furthermore, $Al_2O_3$ may be set to 55 mass % or more or 60 mass %.

[S61: Final Annealing Process]

In the final annealing process, final annealing is performed on the base steel sheet (coil) after the annealing separator applying process. Therefore, the annealing separator is baked, and secondary recrystallization is caused in the base steel sheet.

When the final annealing is performed, the surface of the base steel sheet is oxidized, and a film-shaped oxide is formed on the surface of the base steel sheet.

For example, in the case of applying an annealing separator mainly containing $Al_2O_3$, a film-shaped oxide mainly containing an oxide of Fe and Si, which are the main components of the steel sheet, is formed.

The final annealing conditions are, for example, as described below. The atmosphere in a furnace in the final annealing is not particularly limited and may be a well-known atmosphere.

Final annealing temperature: 1100° C. to 1300° C.

Holding time at final annealing temperature: 20 to 24 hours

When the final annealing temperature is 1100° C. to 1300° C., sufficient secondary recrystallization is developed, and the magnetic properties of the grain-oriented electrical steel sheet are enhanced. Furthermore, the film-shaped oxide is formed on the surface of the base steel sheet.

When the final annealing temperature is lower than 1100° C., there is a case where sufficient secondary recrystallization is not developed. In addition, when the final annealing temperature is higher than 1300° C., there is a case where the coil strength at high temperatures decreases and the coil deforms. In addition, when the holding time is shorter than 20 hours, there is a case where the base steel sheet is poorly purified. On the other hand, when the holding time is longer than 24 hours, the productivity degrades, which is not preferable.

[S62: Cooling Process]

After the final annealing process, a cooling process of cooling the base steel sheet is performed. At this time, the cooling is performed in, a gas atmosphere in which the oxidation degree ($P_{H2O}/P_{H2}$) is 0.30 to 100000 within a temperature range in which the base steel sheet reaches 1100° C. to 500° C. The temperature range of 1100° C. to 500° C. is a temperature range in which the base steel sheet can be oxidized. Therefore, it is possible to form a preferable film-shaped oxide by controlling the oxidation over this broad temperature range.

When the oxidation degree within the temperature range of 1100° C. to 500° C. is less than 0.30, no oxide is formed. In this case, the adhesion of the intermediate layer that is to be formed in the intermediate layer forming process, which is the next process, to the base steel sheet degrades. As a result, in the manufactured grain-oriented electrical steel sheet, the area rate of the intermediate layer-remaining region in which the intermediate layer does not peel off but remains in the region in which the insulation coating peels off after a bend test performed using a mandrel according to JIS K 5600-5-1 (1999) reaches less than 20%. Consequently, the resistance of the insulation coating to peeling due to water (water resistance) degrades. On the other hand, when the oxidation degree within the above-described temperature range exceeds 100000, an internal oxide is formed. In this case, since the internal oxide is not reduced but remains even after the formation of the intermediate layer, the iron loss of the grain oriented electrical steel sheet deteriorates.

Therefore, the oxidation degree of the atmosphere within a temperature range in which the base steel sheet reaches 1100° C. to 500° C. is 0.30 to 100000.

The cooling method within the temperature range in which the base steel sheet reaches 1100° C. to 500° C. is not particularly limited. Examples of the cooling method include a method in which a heater is cut in batch annealing and the base steel sheet is cooled as it is.

With the above-described processes, the base steel sheet in which an internal oxide is substantially not present and the film-shaped oxide is formed, that is, the intermediate steel sheet for a grain-oriented electrical steel sheet according to the present embodiment is manufactured. The intermediate steel sheet for a grain-oriented electrical steel sheet according to the present embodiment substantially does not contain an internal oxide. Therefore, the surface of the base steel sheet after the final annealing process is a smooth surface, and unevenness is suppressed. For example, the arithmetic average roughness Ra of the surface of the base steel sheet is 1.0 µm or less. Therefore, grain-oriented electrical steel sheets that are obtained using this intermediate steel sheet are capable of realizing a low iron loss.

The final annealing also serves as purification annealing. With the purification annealing, the above-described inhibitor components such as Al, N, Mn, S, and Se are removed from steel.

[S7: Intermediate Layer Forming Process]

In the intermediate layer forming process, a heat treatment is performed on the intermediate steel sheet for a grain-oriented electrical steel sheet according to the present embodiment. Therefore, an intermediate layer mainly containing silicon oxide is formed in contact with the surface of the base steel sheet.

The conditions of the heat treatment at the time of forming the intermediate layer are not particularly limited. In the case of forming the intermediate layer in a thickness of 2 to 400 nm, the base steel sheet is preferably held within a temperature range of 300° C. to 1150° C. for five to 120 seconds and more preferably held within a temperature range of 600° C. to 1150° C. for 10 to 60 seconds.

Furthermore, from the viewpoint of preventing the oxidization of the inside of the base steel sheet, the atmosphere in which the base steel sheet is heated up to a temperature range in which the temperature is held and the temperature is held is preferably set to a reducing atmosphere and more preferably set to a hydrogen-mixed nitrogen atmosphere. Examples of the hydrogen-mixed nitrogen atmosphere include an atmosphere containing 5 to 50 vol % of hydrogen with a remainder made up of nitrogen and an impurity and having a dew point of −20° C. to 2° C. Particularly, an atmosphere containing 10 to 35 vol % of hydrogen and a remainder made up of nitrogen and an impurity and having a dew point of −10° C. to 0° C. is preferable.

In the intermediate layer forming process, the film-shaped oxide is reduced, and the above-described intermediate layer mainly containing silicon oxide is formed. Therefore, the adhesion of the intermediate layer to the base steel sheet is enhanced. As a result, in the manufactured grain-oriented electrical steel sheet, the area rate of the intermediate layer-remaining region in which the intermediate layer does not peel off but remains in the region in which the insulation coating peels off after a bend test performed using a mandrel according to JIS K 5600-5-1(1999) reaches 20% or more.

As the heat treatment in the intermediate layer forming process, a separate heat treatment intended only for the formation of the intermediate layer may be performed. The heat treatment may be performed at the same time as or continuously with a heat treatment intended for the formation of the insulation coating. In the case of performing the separate heat treatment intended only for the formation of the intermediate layer, the heat treatment intended for the formation of the insulation coating is separately performed afterwards.

[S8: Insulation Coating Forming Process]

In the insulation coating forming process, an insulation coating made from a compound containing P, O, and Si is formed on the surface of the intermediate layer. The insulation coating may further contain Cr.

In the insulation coating forming process, a coating solution containing phosphoric acid or a phosphate, colloidal silica, and, as necessary, chromic anhydride or a chromate is applied to the surface of the intermediate layer. The coating fluid is applied and then baked, thereby forming an insulation coating in contact with the surface of the intermediate layer.

Examples of the phosphate include phosphates of Ca, Al, Mg, Sr, and the like. The colloidal silica is not particularly limited, and the particle sizes thereof can also be appropriately used. Furthermore, a variety of elements or compounds may be further added to the coating solution in order to improve a variety of characteristics.

The baking conditions are not particularly limited. As the baking conditions, for example, the coating solution is held in an atmosphere containing hydrogen, water vapor, and nitrogen and having an oxidation degree ($P_{H2O}/P_{H2}$) of the atmosphere of 0.0001 to 1.0 within a temperature range of 300° C. to 1150° C. for five to 300 seconds.

In the insulation coating forming process, it is preferable to apply the coating solution to the surface of the intermediate layer and hold and bake the coating solution in an atmosphere having an oxidation degree ($P_{H2O}/P_{H2}$) of the atmosphere of 0.001 to 0.1 within a temperature range of 300° C. to 900° C. for 10 seconds or longer. When the oxidation degree of the atmosphere is 0.001 or more, the phosphate, which is a main configuration phase of the insulation coating, does not easily decompose, and the water resistance is further enhanced. In addition, when the oxidation degree of the atmosphere is 0.1 or less, it is possible to further decrease iron losses.

In the insulation coating forming process, the steel sheet is preferably cooled in an atmosphere in which the oxidation degree, of the gas is held at a lower value such that the insulation coating and the intermediate layer do not change after the baking. The cooling conditions may be ordinary conditions, and, for example, an atmosphere containing hydrogen, nitrogen, water vapor, and an impurity and having an oxidation degree ($P_{H2O}/P_{H2}$) of the atmosphere of less than 0.01 is used.

The method for manufacturing the grain-oriented electrical steel sheet according to the present embodiment may further include a process that is ordinarily performed in methods for manufacturing grain-oriented electrical steel sheets. For example, the method for manufacturing a grain-oriented electrical steel sheet according to the present embodiment may further include a nitriding treatment process of performing a nitriding treatment that increases the N content of the base steel sheet after the decarburization annealing process and before the annealing, separator applying process. This is because it is possible to stably improve the magnetic flux density while a temperature gradient to be imparted, to the steel sheet in the boundary portion between a primary recrystallization region and a secondary recrystallization region is small. The nitriding treatment may be an ordinary nitriding treatment. Examples thereof include a treatment of annealing the decarburization-annealed steel sheet in an atmosphere containing a gas having a nitriding capability such as ammonia, a treatment of final-annealing the decarburization-annealed steel sheet to which an annealing separator containing powder having a nitriding capability such as MnN is applied, and the like.

The present invention is not limited to the above-described embodiments. The above-described embodiments are exemplary examples, and any grain-oriented electrical steel sheets and methods for manufacturing the same are included in the technical scope of the present invention as long as the grain-oriented electrical steel sheets and the manufacturing methods have substantially the same configuration and exhibit the same action and effect as the technical concept described in the claims of the present invention.

EXAMPLES

Hereinafter, the present invention will be specifically described by proposing examples. Hereinafter, conditions in the examples are simply examples of conditions adopted to confirm the feasibility and effect of the present invention. The present invention is not limited to these examples of the conditions. The present invention is capable of adopting a variety of conditions within the scope of the gist of the present invention as long as the object of the present invention is achieved.

Slabs having a chemical com position containing Si: 3.30%, C: 0.050%, acid-soluble Al: 0.030%, N: 0.0080%, Mn: 0.10%, and S and Se: 0.005% in total with a remainder made up of Fe and an impurity were prepared.

The slabs were heated for soaking at 1150° C. for 60 minutes, and hot rolling was performed on the heated slabs, thereby manufacturing hot-rolled steel sheets having a sheet thickness of 2.6 mm. Hot band annealing was performed on the manufactured hot-rolled steel sheets, thereby manufacturing annealed steel sheets. As the conditions of the hot band annealing, the hot-rolled steel sheets were held at an annealing temperature of 900° C. for 120 seconds. Cold rolling was performed on the obtained annealed steel sheets, thereby manufacturing cold-rolled steel sheets having a final sheet thickness of 0.23 mm.

Decarburization annealing was performed on the obtained cold-rolled steel sheets. As the conditions of the decarburization annealing, the cold-rolled steel sheets were held in a wet atmosphere containing 75 vol % of hydrogen with a remainder made up of nitrogen and an impurity at 850° C. for 90 seconds.

An annealing separator containing MgO was applied to the surface of each of the obtained steel sheets at a proportion shown in Table 1. In the annealing separator, the remainder other than MgO was $Al_2O_3$.

Final annealing was performed on the steel sheets to which the annealing separator had been applied and dried, and cooling was performed, thereby obtaining base steel sheets. As the conditions of the final annealing, the steel sheets were heated up to 1200° C. at a temperature rise rate of 15° C./hour in a hydrogen-nitrogen mixed atmosphere and then held at 1200° C. for 20 hours in a hydrogen atmosphere. The heater in batch annealing was stopped, and the final-annealed base steel sheets were cooled as they were. The oxidation degrees ($P_{H2O}/P_{H2}$) represented by the ratio of the water vapor partial pressure to the hydrogen partial pressure within a temperature range in which the base steel sheets reached 1100° C. to 500° C. ere as shown in Table 1.

In addition, all of the chemical compositions of the final-annealed base steel sheets contained Si: 3.30%, C: 0.002% or less, acid-soluble Al: 0.0030% or less, N: 0.0020% or less, Mn: 0.10%, and S and Se: 0.0005% or less in total, and the remainder was made up of Fe and an impurity.

TABLE 1

| Test No. | MgO content in annealing separator (mass %) | Oxidation degree in cooling process ($P_{H2O}/P_{H2}$) | Number density of internal oxide particles (oxide particles/μm$^2$) | Bending diameter (mm) | Evaluation area (mm$^2$) | Insulation coating peeling area (mm$^2$) |
|---|---|---|---|---|---|---|
| 1 | 30 | 0.20 | 0.003 | 16 | 25.1 | 12.5 |
| 2 | 30 | 0.30 | 0.006 | 16 | 25.1 | 3.4 |
| 3 | 30 | 0.10 | 0.019 | 16 | 25.1 | 6.7 |
| 4 | 30 | 10000 | 0.010 | 16 | 25.1 | 2.9 |
| 5 | 40 | 0.0001 | 0.012 | 16 | 25.1 | 10.1 |
| 6 | 40 | 0.0001 | 0.012 | 10 | 15.7 | 15.0 |
| 7 | 40 | 50000 | 0.004 | 16 | 25.1 | 1.8 |
| 8 | 40 | 50000 | 0.004 | 10 | 15.7 | 7.1 |
| 9 | 40 | 200000 | 0.512 | 16 | 25.1 | 7.1 |
| 10 | 95 | 0.30 | 0.048 | 16 | 25.1 | 6.6 |
| 11 | 40 | 0.01 | 0.012 | 16 | 25.1 | 13.5 |
| 12 | 40 | 100 | 0.004 | 16 | 25.1 | 2.5 |
| 13 | 40 | 0.001 | 0.001 | 16 | 25.1 | 9.2 |
| 14 | 40 | 100 | 0.008 | 16 | 25.1 | 3.1 |
| 15 | 40 | 5000 | 0.006 | 10 | 15.7 | 4.1 |
| 16 | 40 | 150000 | 0.497 | 16 | 25.1 | 5.6 |
| 17 | 40 | 0.25 | 0.002 | 16 | 25.1 | 4.2 |

TABLE 1-continued

| Test No. | Intermediate layer residual rate of insulation coating-peeling portion (%) | Insulation coating peeling area after water immersion (mm$^2$) | Peeling area due to water (mm$^2$) | Iron loss (W/kg) | Note |
|---|---|---|---|---|---|
| 1 | 10 | 21.5 | 9.0 | 0.82 | Comparative Example |
| 2 | 30 | 4.0 | 0.6 | 0.85 | Invention Example |
| 3 | 8 | 15.9 | 9.2 | 0.83 | Comparative Example |
| 4 | 54 | 3.6 | 0.7 | 0.87 | Invention Example |
| 5 | 12 | 18.1 | 8.0 | 0.81 | Comparative Example |
| 6 | 3 | 15.7 | 0.7 | 0.81 | Comparative Example |
| 7 | 66 | 1.9 | 0.1 | 0.81 | Invention Example |
| 8 | 38 | 8.3 | 1.2 | 0.81 | Invention Example |
| 9 | 15 | 19.3 | 12.2 | 1.02 | Comparative Example |
| 10 | 30 | 8.9 | 2.3 | 1.00 | Comparative Example |
| 11 | 3 | 25.1 | 11.6 | 0.81 | Comparative Example |
| 12 | 45 | 7.4 | 4.9 | 0.81 | Invention Example |
| 13 | 10 | 18.9 | 9.7 | 0.79 | Comparative Example |
| 14 | 46 | 4.2 | 1.1 | 0.80 | Invention Example |
| 15 | 61 | 5.5 | 1.4 | 0.83 | Invention Example |
| 16 | 17 | 16.1 | 10.5 | 1.12 | Comparative Example |
| 17 | 14 | 17.1 | 12.9 | 0.87 | Comparative Example |

In Test No. 1 to Test No. 12, a heat treatment for forming an intermediate layer and an insulation coating at the same time was performed on the final-annealed base steel sheet.

The conditions of an intermediate layer and insulation coating forming process were as described below.

A coating solution was applied to the surface of the steel sheet. The composition of the coating solution was, by mass %, a phosphate: 50%, colloidal silica: 45%, and chromic anhydride: 5% in Test No. 1 to Test No. 10. The composition of the coating solution in Test No. 11 and Test No. 12 was, by mass %, a phosphate: 55% and colloidal silica: 45%. The steel sheet to which the coating solution had been applied was heated up to 850° C. and held for 30 seconds in an atmosphere containing hydrogen, nitrogen, water vapor, and an impurity and having an oxidation degree ($P_{H2O}/P_{H2}$) of 0.1.

In Test No. 13 to Test No. 17, an intermediate layer forming process and an insulation coating forming process were separately performed. A heat treatment was performed on the final-annealed base steel sheet, thereby forming an intermediate layer. The conditions of the intermediate layer forming process were as described below. The final-annealed steel sheet was heated up to 850° C. and held for 30 seconds in an atmosphere having an oxidation degree ($P_{H2O}/P_{H2}$) of 0.01.

In addition, an insulation coating was formed on the base steel sheet on which the intermediate layer had been formed. In the insulation coating forming process, a coating solution was applied to the surface of the intermediate layer. The composition of the coating solution was a phosphate: 60% and colloidal silica: 40%. The steel sheet to which the coating solution had been applied was heated up to 850° C. and held for 30 seconds in an atmosphere containing 75 vol % of hydrogen with a remainder made up of nitrogen and an impurity to form an insulation coating and was cooled to room temperature.

[Cross Section Observation]

A test piece having a cross section perpendicular to a rolling direction was collected from the grain-oriented electrical steel sheet of each test number, and the cross section was observed with a scanning electron microscope (SEM). A region at a depth of 10 μm from the surface of the steel sheet was observed at a magnification of 10000 times in a range of 100 μm in a direction parallel to the surface of the steel sheet. In Test No. 1 to Test No. 8, Test No. 11 to Test No. 15, and Test No. 17, an internal oxide was rarely formed. That is, the number density of oxide particles having a circle-equivalent diameter of 0.1 μm or more in a region from the surface of the base steel sheet to a depth of 10 μm toward the inside of the base steel sheet was 0.020 oxide particles/μm$^2$ or less.

On the other hand, in Test No. 9 and Test No. 16, a large amount of an internal oxide mainly containing silicon oxide that was to form unevenness on the surface of the base steel sheet was formed. That is, the number density of oxide particles having a circle-equivalent diameter of 0.1 μm or more in region from the surface of the base steel sheet to a depth of 10 μm toward the inside of the base steel sheet was more than 0.020 oxide particles/μm$^2$. In Test No. 10, a large amount of an internal oxide mainly containing forsterite that was to form unevenness on the surface of the base steel sheet and having a circle-equivalent diameter of 0.1 μm or more was formed.

Regarding the grain-oriented electrical steel sheet of each test number, it was also confirmed from an electron beam diffraction pattern and an energy dispersive X-ray analysis (EDX) in the cross section observation with a transmission electron microscope (TEM) that the composition of the intermediate layer was a Fe content of less than 30 atom %, a P content of less than 5 atom %, a Si content of less than 50 atom % and 20 atom % or more, an O content of less than 80 atom % and 50 atom % or more, and a Mg content of 10 atom % or less.

[Adhesion Test]

An adhesion test was performed according to the bend resistance test of JIS K 5600-5-1 (1999). A test piece that was 80 mm long in the rolling direction and 40 mm long in a direction perpendicular to the rolling direction was collected from the grain-oriented electrical steel sheet of each of Test No. 1 to Test No. 17. The collected test piece was coiled around a mandrel having a diameter of 10 mm or 16 mm. In the adhesion test, the test piece was bent 180° using a type 1 testing device described in the bend resistance test of JIS K 5600-5-1 (1999). The total area of portions in which the insulation coating peeled off on the inner side surface of the bent test piece (insulation coating-peeling area) was measured.

After that, the area rate of the intermediate layer-remaining region was obtained by the above-described method. The results are shown in Table 1. The bending diameter in Table 1 indicates the diameter of the mandrel.

In a case where the diameter of the coiled mandrel was 10 mm, the adhesion was determined as excellent when the insulation coating-peeling area was 7.5 mm² or less. In addition, in a case where the diameter of the coiled mandrel was 16 mm, the adhesion was determined as excellent when the insulation coating-peeling area was 5.0 mm² or less.

The evaluation area of insulation coating peeling, in the bend test was defined by the following expression. In a case where the insulation coating peeling area was less than 5% of the evaluation area, the insulation coating peeling area was re-evaluated by decreasing the bending diameter (the diameter of the mandrel). As a result of the re-evaluation, in a case where the insulation coating peeling area was 5% or more of the evaluation area, the area rate of the intermediate layer-remaining region was obtained.

(Evaluation area)=(bending diameter)×(ratio of circumference to diameter)÷2

Regarding the area rate of the intermediate layer-remaining region, a specified insulation coating-peeling region was mapped using an energy dispersive X-ray spectroscope (SEM-EDS), a Si concentration distribution was obtained, in the obtained Si concentration distribution, the maximum value of the Si concentration and the minimum value of the Si concentration were specified, and a region that satisfied the following expression was defined as the intermediate layer-remaining region.

(Si concentration of region)>{(maximum value of Si concentration)+(minimum value of Si concentration)}/2

In addition, the proportion of the total area of the defined intermediate layer-remaining region in the EDS mapping total area of the coating peeling portion was defined as the area rate (%) of the intermediate layer-remaining region. In a case where the area rate of the intermediate layer-remaining region was 20% or more, the adhesion was regarded as satisfying the requirement regulated by the present invention and determined as pass. On the other hand, in a case where the area rate of the intermediate layer-remaining region was less than 20%, the adhesion as regarded as not satisfying the requirement regulated by the present invention and determined as fail.

In a case here the maximum value of the Si concentration and the minimum value of the Si concentration satisfied the following expression, the area rate of the intermediate layer-remaining region was regarded as 0%.

(Maximum value of Si concentration)−(minimum value of Si concentration)<5 atom %

[Water Resistance Test]

A bend test was performed on the test pieces of Test No. 1 to Test No. 17 under the same conditions as in the adhesion test. While the bent portions (bending regions) of the test piece remained bent, the entire bending regions were immersed in pure water for one minute. After one minute elapsed, the test pieces were lifted. After that, the test pieces were dried. The test pieces were bent back, and the insulation coating peeling areas after the water immersion were calculated by image analysis. The peeling areas due to water were calculated by the following expression. The results are shown in Table 1.

(Peeling area due to water)=(insulation coating peeling area after water immersion)−(insulation coating peeling area)

When the peeling area, due to water was 5.0 mm² or less, the water resistance was determined as excellent. On the other hand, when the peeling area due to water was more than 5.0 mm², the water resistance was determined as poor.

[Measurement of Iron Losses]

Regarding iron losses, the iron loss W17/50 (W/kg) at an excited magnetic flux density of 1.7 T and a frequency of 50 Hz was measured by the Epstein test based on JIS C 2550-1. In a case where the iron loss W17/50 was less than 1.00, the iron loss was determined as favorable. On the other hand, in a case where the iron loss W17/50 was 1.00 or more, the iron loss was determined as poor.

With reference to Table 1, in Test No. 2, Test No. 4, Test No. 7, Test No. 8, Test No. 12, Test No. 14, and Test No. 15, the insulation coating peeling areas were small, in addition, the area rates of the intermediate layer-remaining regions reached 20% or more, and the adhesion and the water resistance were excellent. Particularly, in Test No. 2, Test No. 4, Test No. 7, Test No. 8, Test No. 14, and Test No. 15, the peeling areas due to water became smaller than the insulation coating peeling areas, and the water resistance was superior. Furthermore, in these invention examples, the number densities of the internal oxide particles having a circle-equivalent diameter of 0.1 μm or more were 0.020 oxide particles/μm² or less, and the iron losses were favorable. In addition, in these invention examples, the arithmetic average roughness Ra of the surfaces of the base steel sheets was 1.0 μm or less, and the thicknesses of the intermediate layers were 2 to 400 nm. The arithmetic average roughness Ra and the thicknesses of the intermediate layers were measured by the above-described method.

On the other hand, in Test No. 1, Test No. 3, Test No. 5, Test No. 6, Test No 11, and Test Nos. 13 and 17, the oxidation degrees in the cooling process were less than 0.30. Therefore, the area rates of the intermediate layer-remaining regions were less than 20%, and the adhesion was poor. In Test No. 1, Test No. 3, Test No. 5, Test No. 11, Test No. 13, and Test No. 17, the peeling areas due to water were more than 5.0 mm², and the water resistance was poor.

In Test No. 9 and Test No. 16, the oxidation degrees in the cooling process after the final annealing exceeded 100000. Therefore, an internal oxide mainly containing silicon oxide was formed, and the number densities of the internal oxide particles exceeded 0.020 oxide particles/μm². Therefore, it was not possible to obtain a low iron loss, which is necessary for grain-oriented electrical steel sheets.

In Test No. 10, the MgO content in the annealing separator was high. Therefore, an internal oxide mainly containing forsterite was formed, and the number densities of the internal oxide particles having a circle-equivalent diameter of 0.1 μm or more exceeded 0.020 oxide particles/μm². Therefore, it was not possible to obtain a low iron loss, which is necessary for grain-oriented electrical steel sheets.

In Test No. 1, Test No. 3, Test No. 5, Test No. 6, Test No. 9, Test No. 10, Test No. 11, Test No. 13, and Test No. 16, the peeling areas of the insulation coatings were also large.

Hitherto, the embodiment of the present invention has been described. However, the above-described embodiment is simply an exemplary example for performing the present invention. Therefore, the present invention is not limited to the above-described embodiment, and the above-described embodiment can be appropriately modified and performed within the scope of the gist of the present invention.

INDUSTRIAL APPLICABILITY

According to the present invention, it is possible to provide a grain-oriented electrical steel sheet having an intermediate layer mainly containing silicon oxide in which the adhesion of an insulation coating and the water resistance are favorable. In addition, it is possible to provide an intermediate steel sheet for a grain-oriented electrical steel sheet and a method for manufacturing the same.

The invention claimed is:

1. A grain-oriented electrical steel sheet comprising:
   a base steel sheet;
   an intermediate layer that is formed on a surface of the base steel sheet and mainly contains silicon oxide; and
   an insulation coating that is formed on a surface of the intermediate layer,
   wherein a number density of oxide particles in a region from the surface of the base steel sheet to a depth of 10 µm toward an inside of the base steel sheet is 0.020 oxide particles/µm² or less,
   an area rate of an intermediate layer-remaining region in which the intermediate layer does not peel off but remains in a region in which the insulation coating peels off after a bend test performed using a mandrel with a diameter of 10 to 16 mm according to JIS K 5600 May 1 (1999) is 20% or more, and
   in a case where the evaluation area of insulation peeling defined by the following expression is less than 5%, the area rate of the intermediate layer-remaining region is re-evaluated by using a mandrel having a smaller diameter and is 20% or more, (Evaluation area of insulation coating peeling)=(diameter of mandrel)×(ratio of circumference to diameter)÷2.

2. The grain-oriented electrical steel sheet according to claim 1, wherein a composition of the intermediate layer comprises a Fe content of less than 30% by atom, a P content of less than 5% by atom, a Si content of less than 50% by atom and 20% by atom or more, an O content of less than 80% by atom and 50% by atom or more, and a Mg content of 10% by atom or less.

3. A method for manufacturing the grain-oriented electrical steel sheet according to claim 1 comprising:
   a hot rolling process of heating a slab at 1280° C. or lower and then performing hot rolling to manufacture a hot-rolled steel sheet;
   a hot-band annealing process of performing hot band annealing on the hot-rolled steel sheet to manufacture an annealed steel sheet;
   a cold rolling process of performing cold rolling on the annealed steel sheet to manufacture a cold-rolled steel sheet;
   a decarburization annealing process of performing decarburization annealing on the cold-rolled steel sheet to manufacture a base steel sheet;
   an annealing separator applying process of applying an annealing separator having a composition containing 50 mass % or more of alumina and, as a remainder, 0 to 50 mass % of magnesia to the base steel sheet;
   a final annealing process of performing final annealing on the base steel sheet after the annealing separator applying process;
   a cooling process of cooling the base steel sheet after the final annealing process in an atmosphere having an oxidation degree $P_{H2O}/P_{H2}$, which is a ratio of a water vapor partial pressure to a hydrogen partial pressure, within a temperature range of 1100° C. to 500° C. set to 0.30 to 100000;
   an intermediate layer forming process of performing a heat treatment on the base steel sheet after the cooling process to form an intermediate layer mainly containing silicon oxide on a surface of the base steel sheet; and
   an insulation coating forming process of forming an insulation coating on a surface of the intermediate layer after the intermediate layer forming process.

* * * * *